(12) United States Patent
Liu et al.

(10) Patent No.: US 7,448,931 B2
(45) Date of Patent: Nov. 11, 2008

(54) METHOD FOR MANUFACTURING CARBON NANOTUBE FIELD EMISSION DEVICE

(75) Inventors: Yu-Ming Liu, Beijing (CN); Liang Liu, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 534 days.

(21) Appl. No.: 11/114,699

(22) Filed: Apr. 25, 2005

(65) Prior Publication Data

US 2005/0264155 A1    Dec. 1, 2005

(30) Foreign Application Priority Data

May 26, 2004    (CN)    ......... 2004 1 0027408

(51) Int. Cl.
*H01J 1/02*    (2006.01)
*D01F 9/12*    (2006.01)
*B05D 1/18*    (2006.01)

(52) U.S. Cl. .......... 445/24; 313/309; 313/310; 313/493; 427/601; 445/25

(58) Field of Classification Search .......... 445/50
See application file for complete search history.

(56) References Cited

U.S. PATENT DOCUMENTS 6,232,706 B1    5/2001    Dai et al.
6,719,916 B2 *   4/2004    Dubowski et al. .......... 216/65
2002/0159943 A1* 10/2002    Smalley et al. .......... 423/447.1
2003/0094734 A1*  5/2003    Deckard et al. .......... 264/425
2004/0058153 A1*  3/2004    Ren et al. .......... 428/408
2004/0166235 A1*  8/2004    Fujii et al. .......... 427/77
2005/0230270 A1* 10/2005    Ren et al. .......... 205/777.5
2005/0260120 A1* 11/2005    Smalley et al. .......... 423/447.1

FOREIGN PATENT DOCUMENTS

TW    480537    3/2002
TW    483016    4/2002
WO    WO 03/093169 A2    11/2003

* cited by examiner

*Primary Examiner*—Sikha Roy
*Assistant Examiner*—Tracie Y Green
(74) *Attorney, Agent, or Firm*—Morris, Manning & Martin LLP; Tim Tingkang Xia

(57) ABSTRACT

A carbon nanotube field emission device (100) includes a substrate (10), and a carbon nanotube array (30) formed on and secured to the substrate. This avoids separation of the carbon nanotubes from the substrate by electric field force in a strong electric field. Tips of the carbon nanotubes are exposed. A method for manufacturing the carbon nanotube field emission device includes the steps of: (a) depositing a catalyst film (20) on a substrate; (b) forming a carbon nanotube array on the substrate; (c) injecting an adhesive into the carbon nanotube array, and drying the adhesive; and (d) treating surfaces of the carbon nanotube array by laser. The carbon nanotube field emission device has reduced shielding between adjacent carbon nanotubes, reduced threshold voltage, and increased field emission current.

10 Claims, 3 Drawing Sheets

METHOD FOR MANUFACTURING CARBON NANOTUBE FIELD EMISSION DEVICE

BACKGROUND OF THE INVENTION

The invention relates generally to field emission devices and manufacturing methods thereof; and more particularly to a carbon nanotube field emission device and a manufacturing method thereof.

Field emission materials are used in a variety of applications such as, for example, flat panel displays to emit electrons. Typical field emission materials are metals such as, for example, molybdenum (Mo), tantalum (Ta), silicon (Si), and diamond (C). However, such materials need high emission voltages to emit electrons, and cannot carry high electric currents reliably. Carbon nanotubes typically have superior performance; in particular, good electron emission capability at low emission voltages, generally less than 100 volts. Furthermore, carbon nanotubes can carry high electric currents reliably. Due to these properties, carbon nanotubes are considered to be an ideal field emission material for application in a variety of display devices, including flat panel displays such as field emission displays.

Carbon nanotube field emission devices typically include a substrate acting as a cathode plate and a carbon nanotube array formed on the substrate and acting as emitters. Methods for forming the carbon nanotube array on the substrate typically include steps of coating, printing or growing. The printing process is typically performed as follows. Firstly, the carbon nanotubes are mixed in a plasma. Secondly, the mixture is printed on the substrate. Such a printing process has the following disadvantages. The carbon nanotubes are mixed in the plasma and thus cannot contact the substrate directly. Therefore, the electrical contact between the carbon nanotubes and the substrate is bad. The typical result of such bad contact is that the carbon nanotube field emission device cannot emit electrons uniformly and stably.

The growing process is typically performed as follows. Firstly, a catalyst film is deposited on a substrate. Secondly, a carbon nanotube array is grown on the substrate by chemical vapor deposition (CVD). U.S. Pat. No. 6,232,706 discloses a field emission device and a method for manufacturing the field emission device. The field emission device includes a substrate, a catalyst material deposited on a porous surface of the substrate, and one or more bundles of parallel carbon nanotubes extending from the catalyst material in a direction substantially perpendicular to the substrate. The method includes the steps of: (a) depositing a catalyst material on the porous surface of the substrate; and (b) exposing the catalyst material to a carbon containing gas at an elevated temperature such that one or more bundles of parallel carbon nanotubes grow on the substrate. The carbon nanotubes grown on the substrate by this method have good electrical contact with the substrate. However, the carbon nanotubes are not secured on the substrate. Thus, the carbon nanotubes are apt to be pulled out from the substrate by electric field force in a strong electric field.

What is needed, therefore, is a carbon nanotube field emission device that is secured on a substrate and well-connected electrically with the substrate, and that can emit electrons uniformly and stably.

What is also needed is a method for manufacturing the above-described carbon nanotube field emission device.

SUMMARY

The present invention provides a carbon nanotube field emission device including a substrate and a carbon nanotube array formed on and secured to the substrate. In a preferred embodiment, an adhesive is applied to secure the carbon nanotubes on the substrate. This avoids separation of the carbon nanotubes from the substrate by electric field force in a strong electric field. Tips of the carbon nanotubes are exposed.

In another embodiment, a method for manufacturing the carbon nanotube field emission device includes the steps of:
 (a) depositing a catalyst film on a substrate;
 (b) forming a carbon nanotube array on the substrate;
 (c) injecting an adhesive into the carbon nanotube array and drying the adhesive; and
 (d) treating surfaces of the carbon nanotube array by laser.

Compared with a conventional carbon nanotube field emission device, the carbon nanotube field emission device of the preferred embodiment has the following advantages. Firstly, the carbon nanotubes are secured on the substrate by the adhesive. This avoids the carbon nanotubes being pulled out from the substrate by electric field force in a strong electric field. Secondly, the surface of the carbon nanotube array is treated by laser, thus the adhesive at the surface is removed, and the tips of the carbon nanotubes are exposed. This helps ensure that the carbon nanotube field emission device has reduced shielding between adjacent carbon nanotubes, reduced threshold voltage, and increased field emission current. Further, the carbon nanotube field emission device can emit electrons uniformly and stably.

Other advantages and novel features of the invention will become more apparent from the following detailed description of preferred embodiments when taken in conjunction with the accompanying drawings, in which:

DETAILED DESCRIPTION OF PREFERRED EMBODIMENTS

Figure 4:
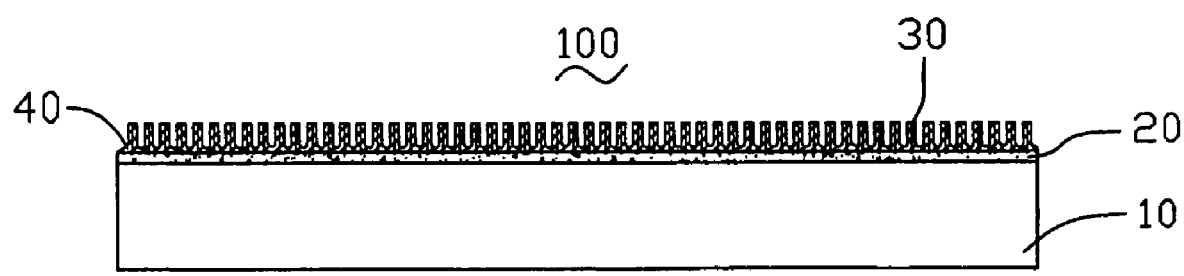
FIG. 4 is similar to FIG. 3, but showing the carbon nanotube array after having been treated by laser according to a preferred embodiment of the present invention.

Referring to FIG. 4, a carbon nanotube field emission device 100 of a preferred embodiment of the present invention is shown. The carbon nanotube field emission device 100 includes a substrate 10, a catalyst film 20 deposited on the substrate 10, and a carbon nanotube array 30 formed on the substrate 10. The carbon nanotube field emission device 100 further adopts an adhesive 40 to secure the carbon nanotube array 30 on the substrate 10. The carbon nanotubes are parallel to each other, and tips of the carbon nanotubes are exposed.

Figure 5:
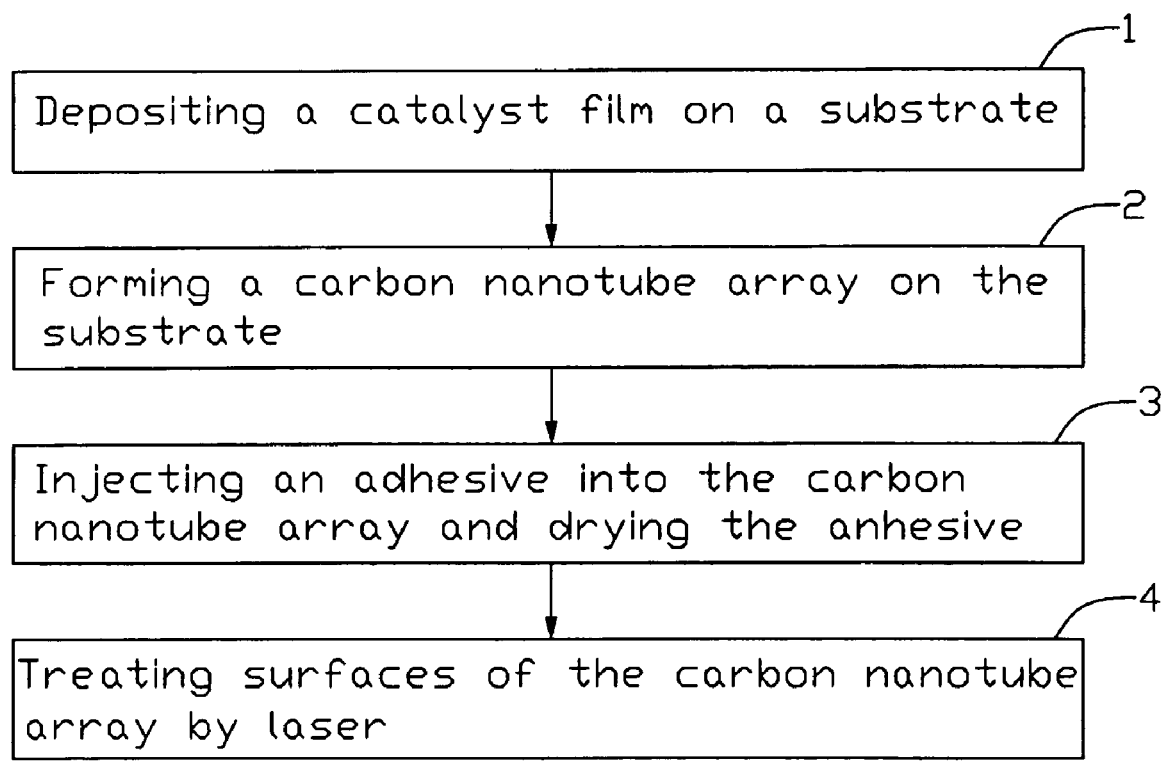
FIG. 5 is a flow chart of a preferred method for manufacturing the carbon nanotube field emission device.

Referring to FIG. 5, a method for manufacturing the carbon nanotube field emission device 100 includes the steps of:

(1) depositing the catalyst film 20 on the substrate 10;
(2) forming the carbon nanotube array 30 on the substrate 10;
(3) injecting the adhesive 10 into the carbon nanotube array 30, and drying the adhesive 40; and
(4) treating surfaces of the carbon nanotube array 30 by laser.

Figure 1:
FIG. 1 is a schematic side elevation of a substrate having a catalyst film deposited thereon according to one embodiment of the present invention.
Figure 2:
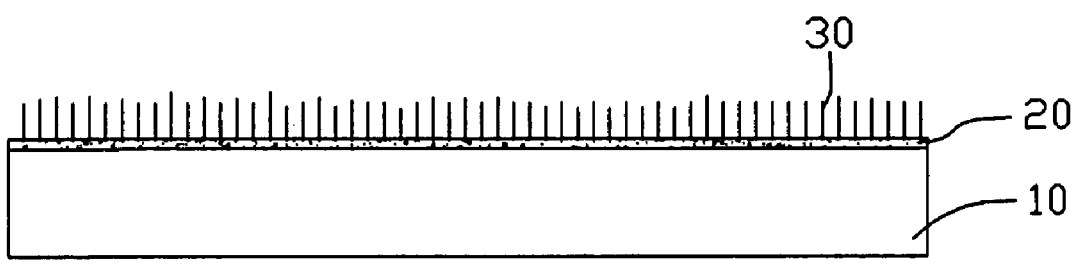
FIG. 2 is similar to FIG. 1, but showing a carbon nanotube array directionally formed on the substrate.
Figure 3:
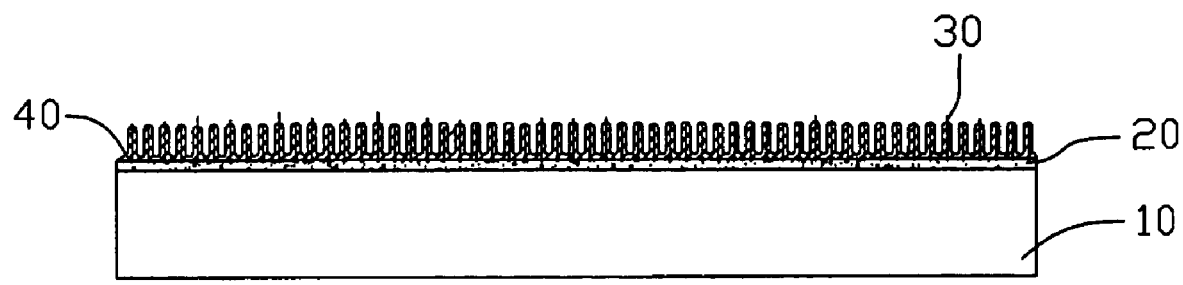
FIG. 3 is similar to FIG. 2, but showing the carbon nanotube array secured on the substrate by an adhesive.

Referring to FIGS. 1, 2 and 3, the steps of the preferred method will be described in detail as follows. Referring to FIG. 1, the substrate 10 having the catalyst film 20 deposited on a surface (not labeled) thereof is shown. The substrate 10 is made of a heat-resistant nonmetal material. The surface can be smooth or porous. In the preferred embodiment, the substrate 10 is made of silicon, and the surface is porous. The catalyst film 20 is uniformly deposited on the surface of the substrate 10 by deposition methods such as, for example, chemical vapor deposition, thermal deposition, electron-beam deposition, or sputtering. The catalyst can be made of Fe, Co, Ni, or an alloy thereof. A thickness of the catalyst film 20 is generally in the range from 1 to 10 nanometers. In the preferred embodiment, the catalyst film 20 is uniformly deposited on the surface of the substrate 10 by electron-beam deposition. The catalyst is made of Fe, and the thickness of the catalyst film 20 is about 5 nanometers.

The catalyst film 20 is oxidized to obtain catalyst particles (not shown). Then, the substrate 10 with the catalyst particles deposited thereon is placed in a reaction furnace (not shown), and a carbon source gas is provided in the reaction furnace at a temperature of 500-800° C. to grow the carbon nanotube array 30 (shown in FIG. 2). The carbon source gas can be acetylene or ethene. A height of the carbon nanotube array 30 can be controlled by controlling the growth time thereof. The height of the carbon nanotube array 30 is generally in the range from 1 to 1000 micrometers. In a preferred embodiment, the temperature of the reaction furnace is about 700° C., and the height of the carbon nanotube array 30 is in the range from 10 to 500 micrometers.

An adhesive 40 is injected into the carbon nanotube array 30 by an injector (not shown). Optimally, the adhesive simply soaks the total carbon nanotube array 30. The redundant adhesive can be blotted up by blotting paper. Then the adhesive 40 is air dried, thereby securing each carbon nanotube on the substrate 10 (shown in FIG. 3). In the preferred embodiment, the adhesive 40 is cyanoacrylate. As shown in FIG. 3, a top of the carbon nanotube array 30 is not flat, and the tips of some short carbon nanotubes are covered by the adhesive 40.

Then, the surfaces of carbon nanotube array 30 are treated by laser to form the carbon nanotube field emission device 100 of the preferred embodiment. As shown in FIG. 4, after being treated by laser, the top of the carbon nanotube array 30 is flat, and the tips of all the carbon nanotubes are exposed. In the preferred embodiment, xenon chloride (XeCl) is adopted as an operating gas, and the wavelength of the laser is about 308 nanometers.

Figure 6:
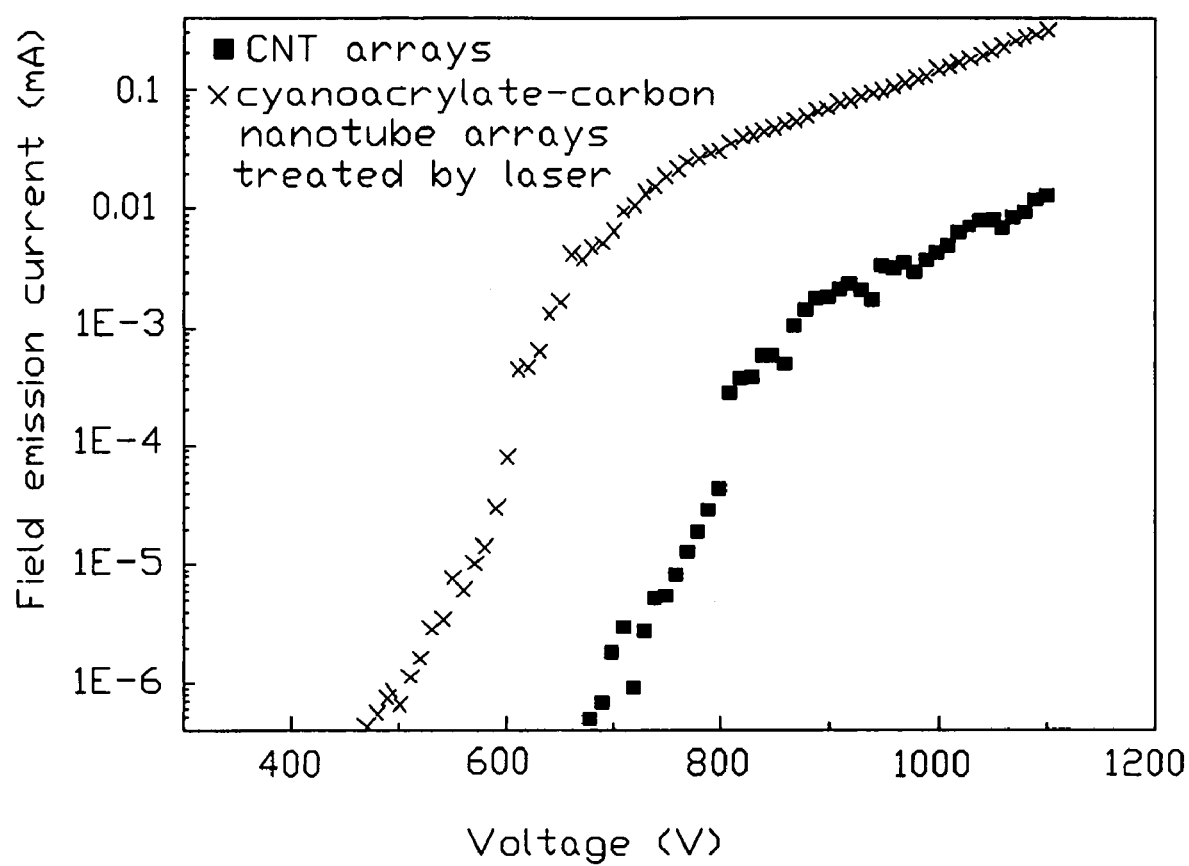
FIG. 6 is a graph showing an I-V (current-voltage) curve of the carbon nanotube array of FIG. 2, and an I-V curve of the carbon nanotube array of FIG. 4.

Compared with a conventional carbon nanotube field emission device, the carbon nanotube field emission device 100 according to the preferred embodiment has the following advantages. Firstly, the carbon nanotubes are secured on the substrate 10 by the adhesive 40. This avoids the carbon nanotubes being pulled out from the substrate 10 by electric field force in a strong electric field. Secondly, the surface of the carbon nanotube array 30 is treated by laser, so that the adhesive 40 at the surface is removed and the tips of the carbon nanotubes are exposed. This helps ensure that the carbon nanotube field emission device 100 has reduced shielding between adjacent carbon nanotubes, reduced threshold voltage, and increased field emission current. These advantages are seen in FIG. 6, which is a graph showing an I-V curve of the carbon nanotube array of FIG. 2 and an I-V curve of the carbon nanotube array of FIG. 4. The carbon nanotube array of FIG. 2 is not soaked by cyanoacrylate and further treated by laser, and the carbon nanotube array of FIG. 4 is soaked by cyanoacrylate and further treated by laser. It can be seen that the carbon nanotube array of FIG. 4 has a lower threshold voltage than the carbon nanotube array of FIG. 2, and has a higher current than the carbon nanotube array of FIG. 2 corresponding to a same voltage. Furthermore, the carbon nanotube field emission device 100 can emit electrons uniformly and stably.

It is understood that the above-described embodiments and methods are intended to illustrate rather than limit the invention. Variations may be made to the embodiments and methods without departing from the spirit of the invention as claimed. The above-described embodiments illustrate the scope of the invention but do not restrict the scope of the invention.

We claim:

1. A method for manufacturing a carbon nanotube field emission device, the method comprising the steps of:
   (a) depositing a catalyst film on a substrate;
   (b) forming a carbon nanotube array on the substrate; and
   (c) injecting an adhesive into the carbon nanotube array, and drying the adhesive.

2. The method as claimed in claim 1, wherein step (a) is performed by chemical vapor deposition, thermal deposition, electron-beam deposition, or sputtering.

3. The method as claimed in claim 1, wherein step (b) is performed by chemical vapor deposition.

4. The method as claimed in claim 1, wherein the adhesive is injected into the carbon nanotube array by an injector.

5. The method as claimed in claim 1, wherein the adhesive substantially soaks the total carbon nanotube array.

6. The method as claimed in claim 1, wherein the adhesive is air dried.

7. The method as claimed in claim 1, further comprising the step of (d) treating one or more surfaces of the carbon nanotube array by laser.

8. The method as claimed in claim 7, wherein in step (d), xenon chloride (XeCl) is adopted as an operating gas, and a wavelength of the laser is about 308 nanometers.

9. A method for manufacturing a field emission device, comprising the steps of:
   providing a substrate;
   depositing a catalyst film on said substrate;
   forming a carbon nanotube array on said substrate with help of said catalyst film;
   attaching an adhesive onto said carbon nanotube array so as to contribute to attachment of said carbon nanotube array to said substrate, said adhesive being injected onto said carbon nanotube array to soak said carbon nanotube array with said adhesive; and
   packing said substrate with said carbon nanotube array into said field emission device.

10. The method as claimed in claim 9, further comprising the step of treating said adhesive-attached carbon nanotube array by a laser so as to ensure exposure of each carbon nanotube of said carbon nanotube array after said adhesive-attaching step.

* * * * *